Nov. 25, 1952 E. WOYDT 2,618,988
GEARING FOR POWER TRANSMISSIONS
Filed Dec. 15, 1949 2 SHEETS—SHEET 1
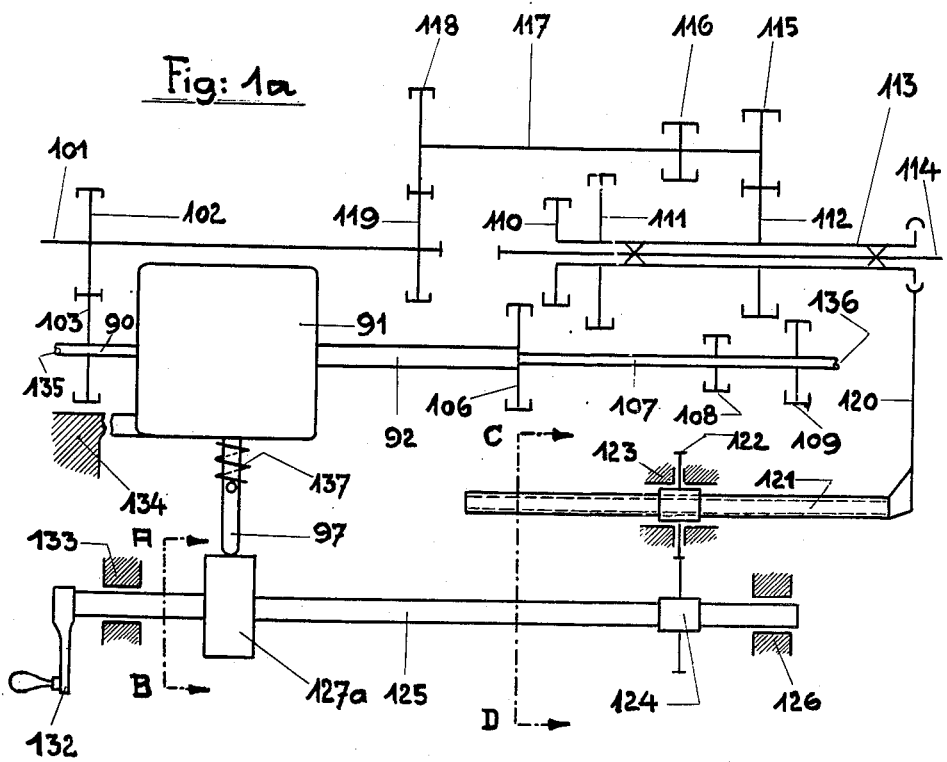
Fig: 1a
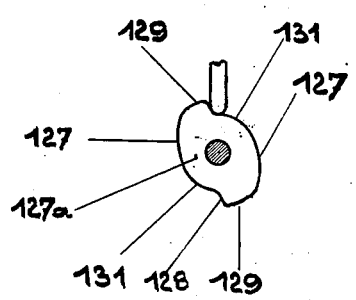
Fig: 2a
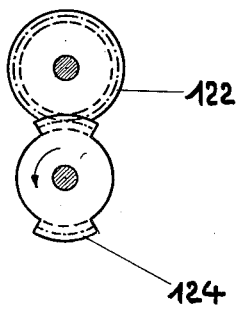
Fig: 3a
INVENTOR
EDWARD WOYDT
By
Jewett, Mead & Browne
ATTORNEYS Nov. 25, 1952  E. WOYDT  2,618,988
GEARING FOR POWER TRANSMISSIONS
Filed Dec. 15, 1949  2 SHEETS—SHEET 2
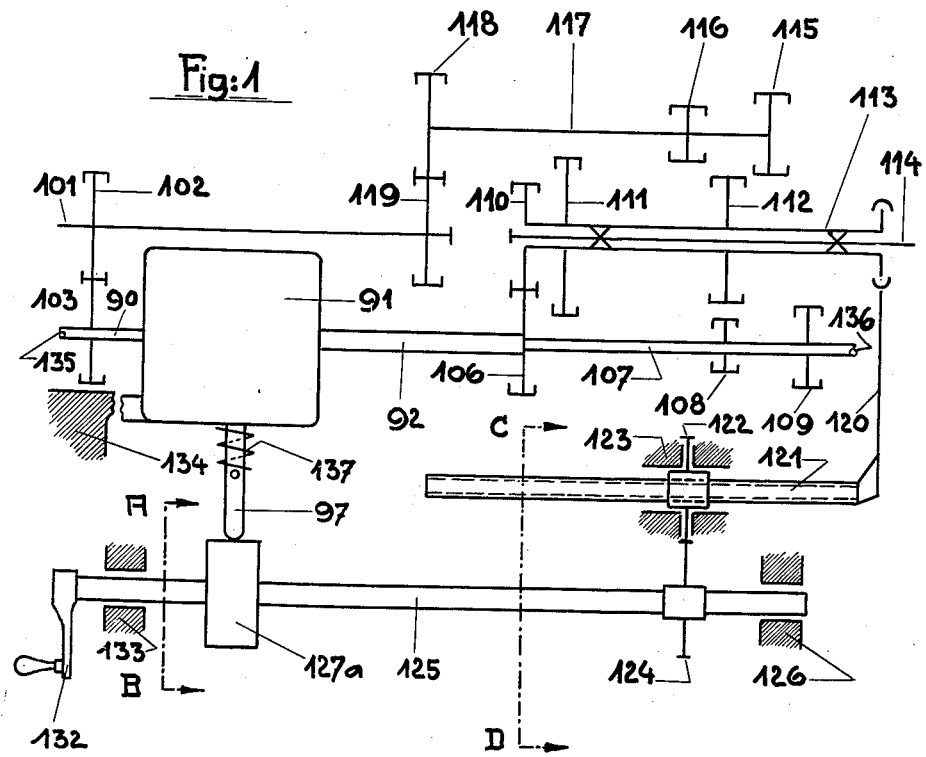
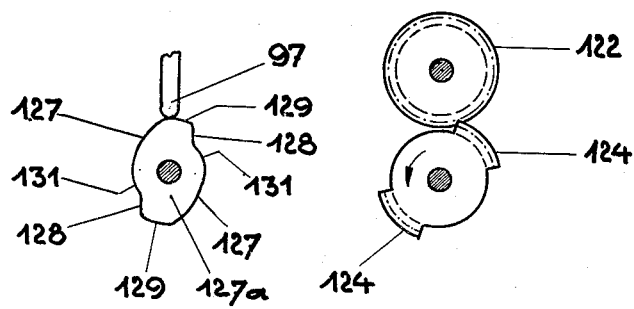
INVENTOR
EDWARD WOYDT
By Jewett, Mead & Browne
ATTORNEYS Patented Nov. 25, 1952

2,618,988

UNITED STATES PATENT OFFICE 2,618,988

GEARING FOR POWER TRANSMISSIONS

Edward Woydt, Stuttgart, Germany

Application December 15, 1949, Serial No. 133,142
In Germany December 20, 1948

7 Claims. (Cl. 74—733)

1

This invention concerns infinitely variable gears.

It is an object of the invention to connect an infinitely variable hydraulic transmission to a system of change gears in such a manner that a large speed range will be obtained with infinite variation within that range using infinitely variable hydraulic transmissions having a small adjusting range only.

For this purpose the speed range of the hydraulic transmissions corresponds at least to the largest stage progression of the change gearing in such a manner, that, by engaging one stage of the change gearing, in conjunction with correspondingly high gear ratio of the hydraulic transmission a speed will be obtained at the driven shaft which is equal to that obtained when the next higher stage of the change gearing is engaged in conjunction with a correspondingly low gear ratio of the hydraulic transmission.

In such a transmission the intervals between the successive change gear ratios are of equal amount and each corresponds to the adjusting range of the hydraulic transmission. Also according to the invention two or more variable hydraulic transmission systems may be provided to overcome very high change gear ratio intervals, the total adjusting range being at least equal to the highest interval in the change gearing.

According to the invention the means for the shifting of the change gearing is inter-connected with the means for the adjustment of the hydraulic transmission system in such a manner that by engaging a higher ratio of change gearing a reduction in the transmission ratio of the hydraulic system is effected, equal in extent to the increase of the change gear ratio. Thereby the speed ratio from the drive part to the driven part will be exactly the same immediately after the gear shifting as it was before. Such an operation may be effected, for example, by having a control shaft carrying a cam which is arranged to actuate the infinitely variable hydraulic transmission system. A second cam or an interrupted gear is synchronised to engage the next higher change gear ratio, the engagement being complete when the reduction of the hydraulic ratio is accomplished. However, in such construction it is necessary to incorporate a clutch to interrupt the power circuit temporarily.

The invention will be described further by way of example with reference to the accompanying drawings in which:

2

Fig. 1 is a schematic view of an entire transmission unit;

Figs. 2 and 3 are side views of the cam and of the gear segment;

Fig. 1a is a schematic view of the transmission unit shown in Fig. 1, when in first engagement position. Figs. 2a and 3a are side views of the cam and gear segment when in first engagement position.

In Fig. 1, the infinitely variable part 91 of the unit is driven through the driving shaft 101 by means of the gears 102 and 103. The supply and discharge of the fluid to the part 91 is effected through the hollow shafts 90, 92, 107 and through the pipes 135 and 136 from or to a container respectively. The casing of the part 91 is secured against rotation at 134. Part 91 may be a hydrostatic fluid drive unit of the type shown and described in Patent No. 2,256,324 and Patent No. 2,255,963. The drive continues to run by means of the shafts 92 and 107 and the gears 106, 108 and 109. A second gear 119 mounted on the driving shaft 101 meshes with the gear 118 of the countershaft 117 which carries also the two gears 115 and 116. Movably arranged on the driven shaft 114, but secured by aid of keys against relative rotation therewith, is the hollow shaft 113 on which the gears 110, 111 and 112 are mounted. The said hollow shaft can be displaced by means of the forked lever 120 fixed on the threaded rod 121. The gear 122 is disposed by its internally threaded hub on the externally threaded rod 121 in such a manner that the latter will be displaced when the gear 122 is rotated. A control shaft 125 is journalled at 126 and 133 and is rotatable by means of the cranked handle 132 whereby the infinitely variable part 91 may be controlled by means of a spring-loaded adjustable pin 97 the end of which bears on the periphery of cam disc 127a, also on shaft 125. A gear having an interrupted periphery 124, 124, as shown in Fig. 3, is also fixed on the control shaft 125. The gear segments 124 are synchronised to engage with the gear 122 when the pin 97 engages the faces 129 or 131 (Fig. 2). Owing to the position of the control shaft according to Fig. 2 the cylindrical cam section 129 has just begun to engage the pin 97, i. e. the infinitely variable part has reached its lowest transmission ratio. At the same time the gear segment 124, as shown in Fig. 3, engages with the gear 122, whereby the threaded rod and therewith the hollow shaft 113 is displaced by means of the shifting fork 120 towards the right. Thereby the gears 106 and 110 are disengaged and the gears 112 and 115 engaged. The position of the gears is in such a manner, that during the displacement the gears 103 and 110 and the gears 112 and 115, both pairs are temporarily engaged at the same time, the ratio through the by-pass system and the normal driving system being equal. Therefore the power transmission will not be interrupted. In continuing the rotation of the control shaft 125, then, when the pair of gears 106 and 110 are entirely disengaged, and the power transmission is obtained through the gears 119, 118, 115, 112, the infinitely variable part 91 will be suddenly returned to its highest transmission ratio due to the action of the steep curve 128, on the cam on the pin 97. Whilst the pin 97 slides over the cylindrical portion 131 the gear 112 will mesh with gear 109 simultaneously with gear 115. In continuing the rotation of the control shaft the gears 112 and 115 are first disengaged and then also the gear segment 124 from the gear 122. Now the curved portion 127 of the cam occupies the position below the adjustable pin 97. The drive is obtained through the gears 102, 103, 109, 112 and the speed variation continues in an infinitely variable manner until the cylindrical cam section 129 occupies the position below the adjustable pin 97. Now the other gear segment 124 will be engaged and a further displacement of the hollow shaft 113 begun, towards the right. Thereby the gears 111 and 116 will be engaged and a little later the gears 109 and 112 disengaged. Now the sudden return movement of the infinitely variable part is again obtained and subsequently the gear 111 will be engaged with the gear 108 and shortly afterwards disengaged with the gear 116. Now the variation of the speed without change gear stages may be again continued.

Figs. 1a, 2a, 3a show the drive according to a first engagement, i. e., after the control shaft 125 has been turned counter clockwise for 45°. During this engagement the control member 97 of the fluid drive was not moved at first, since it was then on section 129 of cam 127a, which describes an arc around the shaft axis. Gear 122 was turned by gear segment 124 so that the hollow shaft 113 was moved to the right. Thus gear 112 executed first the meshing with gear 115 and only after this intermeshing has been partly affected as gear 110 has been disengaged from gear 106.

During this process the hollow shaft 113 and with it the driven shaft 114 has been driven as well over the fluid drive 91 with drive shaft 107 as also over the by-pass shaft 117. The power flow of the drive has thus not been interrupted during the change-over. After the hollow shaft 113 had been displaced so far to the right that the intermeshing of gear 110 and the gear 106 had been eliminated the steep section 128 of cam 127a reached control member 97 of the fluid drive 91 and controlled the latter in such a way that the fluid drive was thereby suddenly returned to the other end of its control area.

With further turning of control shaft 125 section 131 of cam 127a will guide control member 97 without changing the fluid drive transmission ratio, since section 131 forms an ar around the control shaft 125. During this time, segment 124 will bring into engagement gear 112 and gear 109 and it will engage the latter before it has released its engagement with gear 115 of the by-pass shaft 117.

Temporarily the driven shaft 114 is driven simultaneously by gear 115 and gear 109 so that the power flow does not suffer any interruption. The complete engagement of gear 112 with gear 109 will be affected when control shaft 125 will be turned 90°. Upon further turning of the control shaft 125 section 127 will affect control member 97 and control it to vary the transmission ratio while the gear drive is not affected since neither of the two gear segments 124 can affect gear 122.

I claim:

1. A power transmission system comprising: a driving shaft; a driven shaft carrying gears; a countershaft, driven from said driving shaft, carrying gears engageable with said gears carried by said driven shaft; a variable speed fluid drive unit driven from said driving shaft and provided with a power take-off shaft carrying gears engageable with said gears carried by said driven shaft; and control means for varying the speed of said power take-off shaft and for selectively engaging and disengaging said countershaft carried gears and driven shaft carried gears and said power take-off shaft carried gears with said driven shaft carried gears, the gears carried by said driven shaft, countershaft and power take-off shaft being so arranged that pairs of countershaft and driven shaft carried gears and pairs of power take-off shaft and driven shaft carried gears are initially conjointly in mesh during selective engagement and disengagement.

2. A power transmission system comprising: a driving shaft; a driven shaft carrying gears; a countershaft, driven from said driving shaft, carrying gears engageable with gears carried by said driven shaft to provide different transmission ratios between said driving and said driven shafts; a variable speed fluid drive unit driven from said driving shaft; a power take-off shaft, for said fluid drive unit, carrying gears engageable with said gears carried by said driven shaft to provide different transmission ratios between said power take-off and said driven shafts; and control means for varying the transmission ratio of said fluid drive unit and thereby the speed of said power take-off shaft over a range at least as large as the greatest step-jump between the gears carried by said power take-off shaft and the gears carried by said driven shaft and for selectively engaging and disengaging said driven shaft carried gears and said countershaft carried gears and said power take-off carried gears and said driven shaft gears, the gears carried by said driven shaft, countershaft and power take-off shaft being so arranged that pairs of countershaft and driven shaft carried gears and pairs of power take-off shaft and driven shaft carried gears are initially conjointly in mesh during selective engagement and disengagement.

3. A power transmission system comprising: a driving shaft; a driven shaft carrying gears; a countershaft, driven from said driving shaft, carrying gears spaced longitudinally along the axis of said countershaft and engageable with the gears carried by said driven shaft to provide different transmission ratios between said driving and said driven shaft; a variable speed fluid drive unit driven from said driving shaft; a power take-off shaft, for said fluid drive unit, carrying gears spaced longitudinally along the axis of said power take-off shaft and engageable with said driven shaft carried gears to provide different transmission ratios between said power take-off and said driven shafts; and control means for varying the transmission ratio of said fluid drive unit and thereby the speed of said power take-off shaft over a range at least as large as the greatest step-jump between the gears carried by said power take-off shaft and the gears carried by said driven shaft and for selectively engaging and disengaging the driven shaft carried gears with the countershaft carried gears and the power take-off shaft carried gears, the gears carried by said driven shaft, countershaft and power take-off shaft being so arranged that pairs of countershaft and driven shaft carried gears and pairs of power take-off shaft and driven shaft carried gears are initially conjointly in mesh during selective engagement and disengagement.

4. A power transmission system comprising: a driving shaft; a driven shaft; a countershaft, driven from said driving shaft, carrying gears spaced longitudinally along the axis of said countershaft; a variable speed hydrostatic fluid drive unit driven from said driving shaft; a power take-off shaft, for said fluid drive unit, carrying gears spaced longitudinally along the axis of said shaft; a movable power shaft driving said driven shaft and carrying gears spaced longitudinally along the axis of said power shaft and selectively engageable and disengageable with the countershaft carried gears and the power take-off shaft carried gears, the gears carried by said countershaft, power take-off shaft and power shaft being so arranged that pairs of countershaft and power shaft carried gears and pairs of power take-off shaft and power shaft carried gears are initially conjointly in mesh during selective engagement and disengagement; means for moving said power shaft axially to thereby selectively engage the power shaft carried gears with either the countershaft carried gears or the power take-off shaft carried gears; and control means for varying the transmission ratio of said fluid drive unit and thereby the speed of said power take-off shaft.

5. A power transmission system comprising: a driving shaft; a driven shaft; a countershaft, driven from said driving shaft, carrying gears spaced longitudinally along the axis thereof; a variable speed hydrostatic fluid drive unit driven from said driving shaft; a power take-off shaft for said fluid drive unit carrying gears spaced longitudinally along the axis thereof; a hollow power shaft concentric with said driven shaft and carrying gears selectively engageable and disengageable with the countershaft carried gears and the power take-off shaft carried gears, the gears carried by said countershaft, power take-off shaft and power shaft being so arranged that pairs of countershaft and power shaft carried gears and pairs of power take-off shaft and power shaft carried gears are initially conjointly in mesh during selective engagement and disengagement; means located between said hollow power shaft and said driven shaft for driving said driven shaft from said power shaft; control means for moving said hollow power shaft axially, said control means including a movable threaded intermediate shaft and means for moving said power shaft axially in response to movement of said threaded shaft; and means for varying the transmission ratio of said fluid drive unit and thereby the speed of said power take-off shaft.

6. A power transmission system according to claim 5 including means to synchronize the positioning of the hollow power shaft with the varying of the transmission ratio of the fluid drive unit.

7. A power transmission system according to claim 5 wherein the fluid drive unit is driven from the driving shaft by a hollow input shaft and the power take-off shaft is also hollow to form conduits for the flow of liquid to said fluid drive unit.

EDWARD WOYDT.

REFERENCES CITED

The following references are of record in the file of this patent:

UNITED STATES PATENTS

| Number | Name | Date |
|---|---|---|
| 2,178,356 | Brunner | Oct. 31, 1939 |
| 2,213,342 | Gossler | Sept. 3, 1940 |
| 2,241,764 | Bollinger et al. | May 13, 1941 |
| 2,505,842 | Sinclair | May 2, 1950 |

FOREIGN PATENTS

| Number | Country | Date |
|---|---|---|
| 243,182 | Switzerland | June 30, 1946 |
| 873,219 | France | July 2, 1942 |
| 885,427 | France | Sept. 14, 1943 |